(12) United States Patent
Leaders et al.

(10) Patent No.: US 9,410,833 B1
(45) Date of Patent: Aug. 9, 2016

(54) METHODS AND APPARATUS FOR FLUID FLOW MEASUREMENT

(71) Applicant: Soneter, Inc., Atlanta, GA (US)

(72) Inventors: Jeffrey L. Leaders, Mableton, GA (US); Jeffery Dugger, Atlanta, GA (US)

(73) Assignee: Soneter, Inc., Atlanta, GA (US)

( * ) Notice: Subject to any disclaimer, the term of this patent is extended or adjusted under 35 U.S.C. 154(b) by 0 days.

(21) Appl. No.: 15/091,130

(22) Filed: Apr. 5, 2016

Related U.S. Application Data

(62) Division of application No. 14/715,226, filed on May 18, 2015, which is a division of application No. 14/005,169, filed as application No. PCT/US2012/029481 on Mar. 16, 2012, now abandoned.

(60) Provisional application No. 61/454,344, filed on Mar. 18, 2011.

(51) Int. Cl.
*G01F 1/66* (2006.01)
*G06F 19/00* (2011.01)
*G01F 15/06* (2006.01)

(52) U.S. Cl.
CPC ............. *G01F 1/663* (2013.01); *G01F 1/662* (2013.01); *G01F 1/66* (2013.01); *G01F 1/667* (2013.01); *G01F 15/066* (2013.01); *G06F 19/00* (2013.01); *Y10T 29/49826* (2015.01)

(58) Field of Classification Search
CPC .......... G01F 1/661; G01F 1/667; G01F 1/66; H04B 7/08
USPC .......................... 73/861.28, 861.06; 348/588
See application file for complete search history.

(56) References Cited

U.S. PATENT DOCUMENTS

| | | |
|---|---|---|
| 3,780,577 A | 12/1973 | Brown |
| 3,818,757 A | 6/1974 | Brown |

(Continued)

FOREIGN PATENT DOCUMENTS

| | | |
|---|---|---|
| DE | 19962954 | 6/2001 |
| DE | 10140792 | 3/2003 |

(Continued)

OTHER PUBLICATIONS

Carlson, J. et al., "Ultrasonic particle velocimetry in multiphase flows," Ultrasonics Symposium, 2002. Proceedings. 2002 IEEE Date of Conference: Oct. 8-11, 2002.

(Continued)

*Primary Examiner* — Lisa Caputo
*Assistant Examiner* — Nathaniel T Woodward
(74) *Attorney, Agent, or Firm* — John D. Lanza; Foley & Lardner LLP

(57) ABSTRACT

A fluid flow meter estimates the velocity of water or another fluid flowing through pipe by comparing measurements of the water velocity to one or more pre-determined templates. The fluid flow meter may collect measurement signals from one or more flow sensors, estimate the fluid velocity or flow rate by comparing the measurement signals to the template, and either store the comparison results in local memory, transmit the results to a remote memory or server, or both. In some embodiments, the fluid flow meter transmits the results to a server via a wireless interface. The transducers and processing system can be powered by a battery, a power line, or, for manifolds installed outdoors, a solar cell. Example transducers and processing systems may also have a passive wake-up feature for power reduction; that is, they may only draw power when water or another fluid flows through the pipe.

20 Claims, 10 Drawing Sheets

(56) References Cited

U.S. PATENT DOCUMENTS

| | | | |
|---|---|---|---|
| 3,935,735 | A | 2/1976 | Lee |
| 4,540,849 | A | 9/1985 | Oliver |
| 4,545,244 | A | 10/1985 | Yasuda et al. |
| 4,838,127 | A | 6/1989 | Herremans et al. |
| 4,848,164 | A | 7/1989 | Quarve et al. |
| 4,902,965 | A | 2/1990 | Bodrug et al. |
| 4,940,976 | A | 7/1990 | Gastouniotis et al. |
| 5,010,568 | A | 4/1991 | Merriam et al. |
| 5,179,862 | A | 1/1993 | Lynnworth |
| 5,251,490 | A | 10/1993 | Kronberg |
| 5,381,462 | A | 1/1995 | Larson et al. |
| 5,493,287 | A | 2/1996 | Bane |
| 5,553,505 | A | 9/1996 | Bignell et al. |
| 5,639,972 | A | 6/1997 | Hastings et al. |
| 5,661,527 | A * | 8/1997 | Ferguson ............... H04N 17/00 348/554 |
| 5,721,383 | A | 2/1998 | Franklin et al. |
| 5,753,824 | A | 5/1998 | Fletcher-Haynes |
| 5,767,790 | A | 6/1998 | Jovellana |
| 5,777,237 | A | 7/1998 | Collier et al. |
| 5,895,866 | A | 4/1999 | Neukermans et al. |
| 5,970,801 | A | 10/1999 | Ciobanu et al. |
| 5,974,897 | A | 11/1999 | Koyano et al. |
| 5,986,574 | A | 11/1999 | Colton |
| 6,049,791 | A | 4/2000 | Lerner |
| 6,065,350 | A | 5/2000 | Hill et al. |
| 6,065,351 | A | 5/2000 | Nagaoka et al. |
| 6,158,288 | A | 12/2000 | Smith |
| 6,305,233 | B1 * | 10/2001 | Braathen ............... G01F 1/667 73/861.27 |
| 6,330,831 | B1 | 12/2001 | Lynnworth et al. |
| 6,390,999 | B1 | 5/2002 | Zscheile et al. |
| 6,397,683 | B1 | 6/2002 | Hagenmeyer et al. |
| 6,508,135 | B1 | 1/2003 | Martin et al. |
| 6,556,142 | B2 | 4/2003 | Dunstan |
| 6,618,709 | B1 | 9/2003 | Sneeringer |
| 6,657,552 | B2 | 12/2003 | Belski et al. |
| 6,745,632 | B1 * | 6/2004 | Dryer ................... G01N 29/024 73/597 |
| 6,758,100 | B2 | 7/2004 | Huang |
| 6,766,276 | B1 | 7/2004 | Dury |
| 6,772,643 | B2 | 8/2004 | Eguchi et al. |
| 6,782,761 | B2 | 8/2004 | Imai et al. |
| 6,868,741 | B2 | 3/2005 | Harman |
| 6,871,534 | B1 | 3/2005 | Hamada et al. |
| 6,900,737 | B1 | 5/2005 | Ardalan et al. |
| 6,900,738 | B2 | 5/2005 | Crichlow |
| 6,901,813 | B2 | 6/2005 | Riegel |
| 6,947,854 | B2 | 9/2005 | Swarztrauber et al. |
| 6,956,500 | B1 | 10/2005 | Ducharme et al. |
| 7,024,944 | B2 | 4/2006 | Imai et al. |
| 7,027,808 | B2 | 4/2006 | Wesby |
| 7,039,529 | B2 | 5/2006 | Keech |
| 7,058,549 | B2 | 6/2006 | Gysling et al. |
| 7,059,200 | B2 | 6/2006 | Sallee |
| 7,098,783 | B2 | 8/2006 | Crichlow |
| 7,117,104 | B2 | 10/2006 | Urdaneta et al. |
| 7,126,493 | B2 | 10/2006 | Junker et al. |
| 7,204,157 | B2 | 4/2007 | Furmidge et al. |
| 7,310,052 | B2 | 12/2007 | Bowman |
| 7,315,257 | B2 | 1/2008 | Patterson et al. |
| 7,330,797 | B2 | 2/2008 | Bailey et al. |
| 7,342,504 | B2 | 3/2008 | Crane et al. |
| 7,342,506 | B2 | 3/2008 | Paoli et al. |
| 7,389,187 | B2 | 6/2008 | Kersey et al. |
| 7,443,313 | B2 | 10/2008 | Davis et al. |
| 7,673,527 | B2 | 3/2010 | Ehring et al. |
| 7,701,580 | B2 | 4/2010 | Bassler et al. |
| 7,747,534 | B2 | 6/2010 | Villicana et al. |
| 8,019,559 | B1 | 9/2011 | Stevens et al. |
| D662,432 | S | 6/2012 | Leaders et al. |
| 8,489,342 | B2 | 7/2013 | Dugger et al. |
| 2004/0006439 | A1 | 1/2004 | Hunter |
| 2004/0059585 | A1 | 3/2004 | Villicana et al. |
| 2004/0243524 | A1 | 12/2004 | Crichlow |
| 2005/0033534 | A1 | 2/2005 | Villicana et al. |
| 2005/0245827 | A1 | 11/2005 | Takeda et al. |
| 2006/0012491 | A1 | 1/2006 | Mahowald |
| 2006/0020404 | A1 | 1/2006 | Kishiro et al. |
| 2006/0117867 | A1 * | 6/2006 | Froehlich ................. G01F 1/66 73/861.28 |
| 2006/0247869 | A1 | 11/2006 | Lucero |
| 2007/0005273 | A1 | 1/2007 | Heidl et al. |
| 2007/0284293 | A1 | 12/2007 | Pitchford et al. |
| 2008/0001778 | A1 | 1/2008 | Challener et al. |
| 2008/0048883 | A1 | 2/2008 | Boaz |
| 2008/0086394 | A1 | 4/2008 | O'Neil et al. |
| 2008/0129538 | A1 | 6/2008 | Vaswani et al. |
| 2008/0132185 | A1 | 6/2008 | Elliott et al. |
| 2008/0150751 | A1 | 6/2008 | Sala et al. |
| 2008/0156107 | A1 | 7/2008 | Ao et al. |
| 2008/0177678 | A1 | 7/2008 | Di Martini et al. |
| 2008/0180274 | A1 | 7/2008 | Cumeralto et al. |
| 2008/0196511 | A1 | 8/2008 | Ehring et al. |
| 2008/0224892 | A1 | 9/2008 | Bogolea et al. |
| 2008/0250870 | A1 | 10/2008 | Rhodes |
| 2008/0272933 | A1 | 11/2008 | Cahill-O'Brien et al. |
| 2008/0302172 | A1 | 12/2008 | Kates |
| 2009/0006107 | A1 | 1/2009 | Golden |
| 2009/0102681 | A1 | 4/2009 | Brennan et al. |
| 2009/0109056 | A1 | 4/2009 | Tamarkin et al. |
| 2009/0153356 | A1 | 6/2009 | Holt |
| 2009/0160674 | A1 | 6/2009 | Vangala |
| 2009/0189778 | A1 | 7/2009 | Juan et al. |
| 2009/0217771 | A1 | 9/2009 | Hoecker |
| 2009/0309755 | A1 * | 12/2009 | Williamson ........... G01D 4/004 340/870.02 |
| 2010/0313958 | A1 | 12/2010 | Patel et al. |
| 2011/0074601 | A1 | 3/2011 | Cornwall |
| 2011/0219885 | A1 | 9/2011 | Shumilov et al. |
| 2011/0288794 | A1 | 11/2011 | Chen |
| 2012/0017700 | A1 | 1/2012 | Wiest et al. |
| 2012/0144930 | A1 | 6/2012 | Aughton et al. |
| 2012/0173169 | A1 | 7/2012 | Skelding |

FOREIGN PATENT DOCUMENTS

| | | |
|---|---|---|
| DE | 10210788 | 9/2003 |
| DE | 20 2005 004 510 | 10/2005 |
| DE | 20 2006 001 060 | 6/2006 |
| DE | 10 2006 050 729 | 5/2008 |
| DE | 10 2007 035 478 | 2/2009 |
| DE | 10 2007 059 032 | 6/2009 |
| EP | 0 736 751 | 3/1996 |
| EP | 0 834 849 | 4/1996 |
| EP | 0 629 098 A2 | 12/2001 |
| EP | 1 306 823 | 5/2003 |
| EP | 1 887 327 | 2/2008 |
| EP | 2 012 093 | 4/2008 |
| EP | 1 983 311 | 10/2008 |
| EP | 2 131 162 A1 | 12/2009 |
| GB | 2 229 834 | 10/1990 |
| GB | 2 440 961 | 2/2008 |
| GB | 2 452 072 | 2/2009 |
| JP | 55-027938 | 2/1980 |
| JP | S57-128852 | 8/1982 |
| JP | 10-255190 | 9/1998 |
| JP | 2002-048598 | 2/2002 |
| JP | 2002-296290 | 10/2002 |
| JP | 2003-152881 | 5/2003 |
| JP | 2004-094766 | 3/2004 |
| JP | 2005-321222 | 11/2005 |
| JP | 2007-071695 A | 3/2007 |
| JP | 2008-507693 | 3/2008 |
| JP | 2008-275607 | 11/2008 |
| JP | 2008-298560 | 12/2008 |
| JP | 2008-304281 | 12/2008 |
| JP | 2009-008406 | 1/2009 |
| JP | 2009-085972 | 4/2009 |
| JP | 11-086173 | 4/2011 |
| KR | 100769619 | 10/2007 |
| UA | 72865 | 4/2005 |
| WO | WO-90/00724 | 1/1990 |
| WO | WO-98/52003 | 11/1998 |

(56) References Cited

FOREIGN PATENT DOCUMENTS

| WO | WO-99/31612 | 6/1999 |
|----|----|----|
| WO | WO-99/57697 | 11/1999 |
| WO | WO-00/03206 A1 | 1/2000 |
| WO | WO-01/35366 | 5/2001 |
| WO | WO-02/057721 | 7/2002 |
| WO | WO-02/060120 | 8/2002 |
| WO | WO-02/084558 | 10/2002 |
| WO | WO-03/006924 | 1/2003 |
| WO | WO-2004/008414 | 1/2004 |
| WO | WO-2004/099732 | 11/2004 |
| WO | WO-2005/015890 | 2/2005 |
| WO | WO-2007/131169 | 11/2007 |
| WO | WO-2008/025939 | 3/2008 |
| WO | WO-2008/053193 A1 | 5/2008 |
| WO | WO-2009/011817 | 1/2009 |
| WO | WO-2009/043065 | 4/2009 |
| WO | WO-2009/044126 | 4/2009 |
| WO | WO-2010/091648 A1 | 8/2010 |

OTHER PUBLICATIONS

Extended European Search Report issued Aug. 7, 2014 in European Patent Application No. 12759881.1.
International Report on Patentability on PCT/US2012/029481 dated 710/3/2013.
International Search Report on PCT/US2012/029481 dated Jul. 13, 2012.
Japanese Notification of Reasons for Refusal on 2013-558215 dated Jan. 26, 2016.
Jimenez, A. et al., "Aqueous-liquids characterization based on encoded ultrasonic signals," IEEE International Symposium on Intelligent Signal Processing, 2009. WISP 2009. Date of Conference: Aug. 26-28, 2009.
Kikura, Hiroshige et al., "Velocity profile measurements in bubbly flow using multi-wave ultrasound technique, " Chemical Engineering Communications, v 197, n 2, p. 114-133, Jan. 2010.
Notice of Allowance on U.S. Appl. No. 13/691,296 dated Mar. 20, 2013.
Oberg, K; Mueller, D S., "Validation of Streamflow Measurements Made with Acoustic Doppler Current Profilers," Journal of Hydraulic Engineering 12 (Dec. 2007): 1421-1432.
Office Action on U.S. Appl. No. 14/005,169 dated Nov. 13, 2014.
Office Action on U.S. Appl. No. 14/005,169 dated Apr. 17, 2015.
Office Action on U.S. Appl. No. 14/005,169 dated Sep. 17, 2015.
Office Action on U.S. Appl. No. 14/715,226 dated Dec. 31, 2015.
Swillens, A; Lovstakken, L; Kips, J; Torp, H; Segers, P., "Ultrasound simulation of complex flow velocity fields based on computational fluid dynamics," IEEE Transactions on Ultrasonics, Ferroelectrics and Frequency Control 56. 3 (2009).
Wannamaker et al., A Theory of Nonsubtractive Dither, IEEE Transactions on Signal Processing, vol. 48, No. 2, Feb. 2000.
Written Opinion on PCT/US2012/029481 dated Jul. 13, 2012.
Office Action on U.S. Appl. No. 14/715,226 dated May 26, 2016.

* cited by examiner

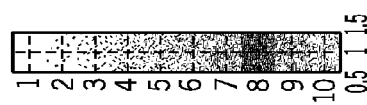
FIG. 6C
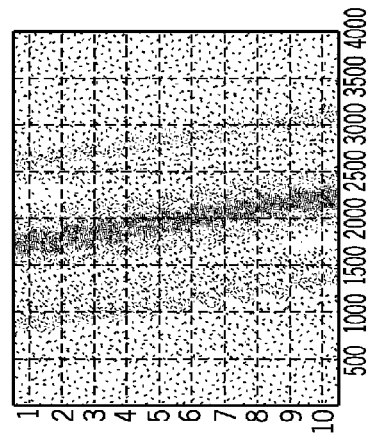
FIG. 5B
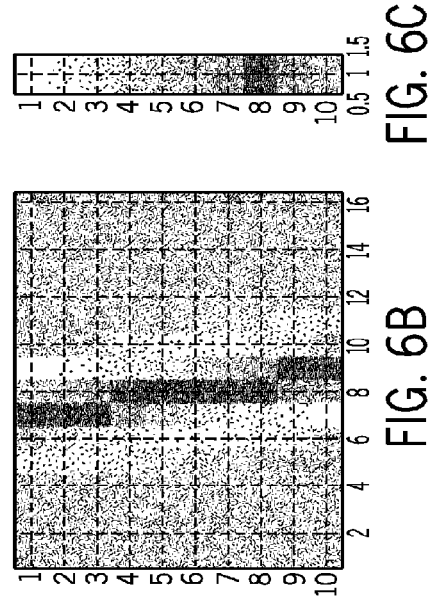
FIG. 6B
FIG. 5A
FIG. 6A

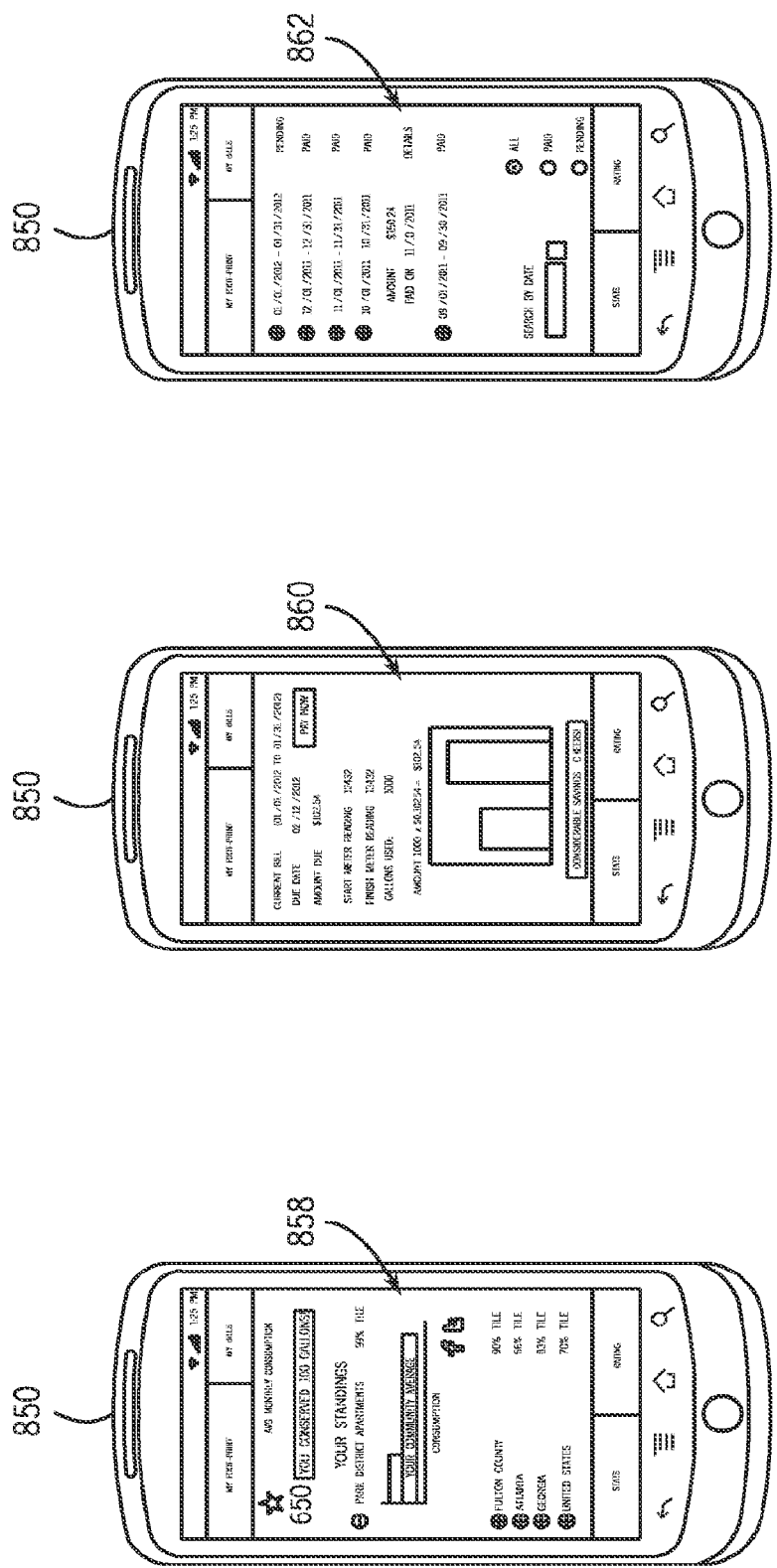

METHODS AND APPARATUS FOR FLUID FLOW MEASUREMENT

RELATED APPLICATION

This application is a U.S. Divisional Application under 35 U.S.C. §121 of U.S. application Ser. No. 14/715,226, filed on May 18, 2015, which is a U.S. Divisional Application of U.S. National Stage application Ser. No. 14/005,169, entitled "Methods and Apparatus for Fluid Flow Measurement" filed on Nov. 21, 2013, which claims priority under 35 U.S.C. §371 of International Application No. PCT/US2012/029481, filed on Mar. 16, 2012, which claims the benefit under 35 U.S.C. §119 of U.S. Provisional Application No. 61/454,344, entitled "Water Manifold with Integrated Flow Sensor" and filed Mar. 18, 2011. The entire contents of the foregoing applications are hereby-incorporated herein by reference.

BACKGROUND

A rapidly rising global population is putting increasing pressure on natural resources. Demand for food, water, and energy is expected to rise by 30-50% over the next 20 years. Limited availability of water resources has implications for both the new development of real estate as well for the continued use of already-developed property.

New real estate development opportunities may be increasingly limited by water availability. Existing or anticipated water shortages may cause regulators to restrict or prohibit housing development. For example, the State of California currently requires water agencies to withhold approval for developments until a determination is made that sufficient water resources exist to serve a proposed development for a period of 20 years.

SUMMARY

Embodiments of the present technology include a fluid flow meter and a method of measuring fluid velocity. In one example, the fluid flow meter includes a sensor, a memory, and a processor. The sensor is configured to generate a measurement signal by detecting an ultrasonic signal representative of a velocity of a fluid flowing through a lumen. The sensor is also configured to provide a measurement signal representative of the velocity. The memory configured to store a template associated with a possible velocity of the fluid. The processor, which is communicatively coupled to the sensor and to the memory, is configured to compare the measurement signal to the template and to determine an estimated velocity of the fluid based on the comparison. The fluid flow meter may also include a fixation device, such as a lock, clamshell hinge, adhesive, or other suitable device, to secure the sensor to a vessel that defines the lumen. It may also include a communications interface, communicatively coupled to the processor, to transmit a data, such as representations of the estimated velocity or the measurement signal, to a server.

In one instance, the sensor includes a first transducer to transmit the ultrasonic signal through the fluid flowing through the lumen and a second transducer to receive a reflected, scattered, or transmitted copy of the ultrasonic signal. The sensor also includes a front end, which can be coupled to the first transducer, second transducer, or both, that is configured to produce the measurement signal from the reflected, scattered, or transmitted copy of the ultrasonic signal. The ultrasonic signal can be a first ultrasonic signal, in which case the second transducer may be further configured to transmit a second ultrasonic signal through the fluid flowing through the lumen, and the first transducer may be configured to receive a reflected, scattered, or transmitted copy of the second ultrasonic signal. In such a case, the front end is further configured to produce the measurement signal based on a difference of the reflected, scattered, or transmitted copy of the first ultrasonic signal and the reflected, scattered, or transmitted copy of the second ultrasonic signal.

The memory in an exemplary fluid flow meter may be configured to store a plurality of templates, where each template in the plurality of templates corresponding to a different possible velocity of the fluid flowing through the lumen. In such a case, the processor can be further configured to compare the measurement signal to each template in the plurality of templates. In some examples, the template is produced at a first sampling frequency and stored in the memory at a second sampling frequency lower than the first sampling frequency. The processor may also be configured to interpolate the measurement signal, the template, or both before or while performing the comparison. In addition, the processor can add a first random waveform to the measurement signal and a second random waveform to the template before performing the comparison.

In certain examples, the fluid flow meter also includes a manifold that defines the lumen through which the fluid flows. Such a manifold may include an inlet to channel the fluid into the lumen and one or more outlets to channel the fluid out of the lumen. The sensor may be configured to measure the velocity of the fluid flowing into or out of the lumen.

Another embodiment of the present disclosure includes a method of installing a fluid flow meter, e.g., examples of the fluid flow meter described above. Such an installation method may include securing the fluid flow meter to an exterior of a structure that defines the lumen. It may also include calibrating the sensor by setting the velocity or flow rate of the fluid to a known value (e.g., no flow, 1 gallon per minute, etc.), generating an estimated velocity with fluid flow meter, and calibrating the fluid flow meter based on the known value and the estimated velocity. Calibration may also include generating an estimated diameter of the lumen based on the known value and the estimated velocity and possibly verifying the diameter of the lumen based the estimated diameter and a description of the lumen or the structure.

Embodiments of the inventive subject matter include water manifolds with integrated flow sensors that address problems associated with insufficient water resources. Example water manifolds include an inlet port to channel water into a lumen and several (e.g., 2-100) outlet ports that channel water out of the lumen. At least one of the outlet ports includes an integrated flow sensor that measures the flow rate of water flowing from the lumen. In some cases, the flow sensor includes a transmit transducer and a second transducer to transmit and detect, respectively, an ultrasonic signal that propagates through the water flowing from the lumen. Alternative flow rate sensors may include magnetic field sources or impellers disposed with output lumens defined by the outlet ports.

Example water manifolds may also include a wireless interface to transmit data collected by the flow sensors, a processor to monitor data collected by the flow sensors, and a memory to store data collected by the flow sensors. The processor can be configured to interface with a server via the wireless interface, and the server may provide a dashboard (via a smart phone or other networked device) that indicates water usage statistics based on flow rate data collected by the flow sensors. Flow rate data and water usage statistics can be used to reduce water consumption through analysis of usage patterns, elimination of waste, and incentives for lowered water use.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate embodiments of the disclosed technology and together with the description serve to explain principles of the disclosed technology.

FIG. 5A is a line plot of apodized templates associated with different fluid flow velocities (pulse delays) generated at a first (higher) sampling frequency.

FIG. 5B is an image plot of the apodized templates of FIG. 5A.

FIG. 6A is a line plot of an apodized template at a first (higher) sampling frequency (smooth curve) and at a second (lower) sampling frequency (jagged curve).

FIG. 6B is an image plot of the apodized templates of FIGS. 5A and 5B down-sampled to the second (lower) sampling frequency of FIG. 6A.

FIG. 6C is an image plot that illustrates a correlation between a received ultrasonic pulse and the down-sampled templates of FIG. 6B.

FIGS. 8C-8H show screenshots of a dashboard provided by the fluid metering system shown in FIGS. 8A and 8B.

DETAILED DESCRIPTION

Figure 1A:
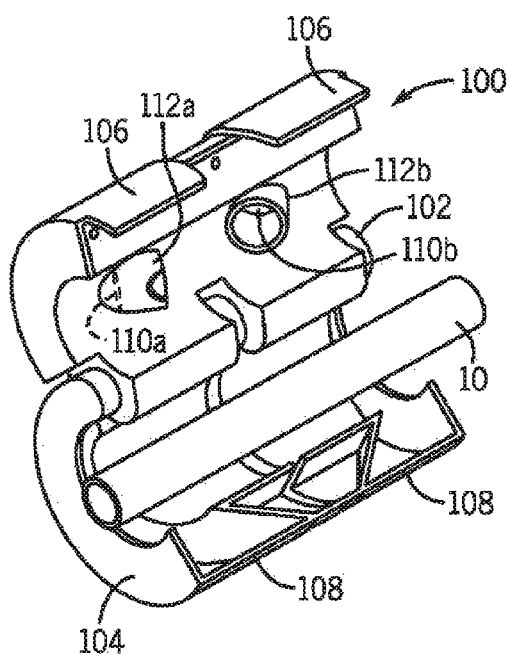
FIGS. 1A and 1B show an ultrasonic fluid flow meter before (FIG. 1A) and after (FIG. 1B) installation around a pipe.

Following below are more detailed descriptions of various concepts related to, and embodiments of, inventive systems, methods and apparatus for providing fluid flow metering. Features of exemplary fluid flow meters may include, but are not limited to: real-time usage information; accurate metering at low flow rates; accurate calculation of fluid loss; detection of abnormal fluid usage; detection of continuous low velocities; remote meter reading; no moving parts; battery or line power; and no-flow and reverse flow detection. The various concepts introduced above and discussed in greater detail below may be implemented in any of numerous ways, as the disclosed concepts are not limited to any particular manner of implementation. Examples of specific implementations and applications are provided primarily for illustrative purposes.

An exemplary fluid flow meter can engage tenants, reduce cost, and provide automated reporting for property owners and managers. It can engage a tenant by informing the tenant of his or her usage in real-time, and by providing monthly bills. A fluid flow meter may also provide usage information and other data to property owners and managers, which enables the property owners and managers to identify and reduce leaks, waste, and unauthorized usage. This allows management to receive utility payments sooner and reduces management's risk and costs associated with wasteful consumption and leaks. It also helps to ensure that tenants pay only for what they use. In addition, a fluid flow meter may enable automated reporting that compares building performance to similar buildings in a property manager's portfolio or to a competitor's portfolio. Automated reporting may also enable evaluation of a tenant or building owner's environmental performance, including carbon and water use footprinting.

An exemplary fluid flow meters can be installed on a pipe in multi-tenant rental or institutional housing to monitor water consumption in one or more individual apartments. A server or other computing device may collect information from the fluid flow meter about each tenant's water usage, making it possible to identify tenants whose water usage is abnormally high or low. This information may also make it possible to supply individuals with real-time consumption information as well as coaching and social pressures (e.g., public rankings) that promote water conservation. For example, a server communicatively coupled to a fluid flow meter may proactively notify residents of their own usage rates, their neighbors' usage rates, target usage rates, etc.

An exemplary fluid flow meter can also be used to monitor occupied and vacant units. This feature may be used during new construction of the community and once property leasing commences. A fluid flow meter can identify events such as undetected leaks and pipe bursts due to freezing, saving owners and residents money by limiting damage and repair costs. The meter can also sense temperatures in the units and can warn management and residents of conditions that may cause damage such as pipe freezing. The fluid flow meter (possibly together with a server) may alert management of these conditions via email, text message, phone, or any other suitable communications method.

Fluid Flow Meters

FIGS. 1A-1D show a non-invasive fluid flow meter 100 that clamps around a pipe 10, which defines a lumen containing flowing fluid (e.g., water, gas, oil, or sewage). The fluid flow meter 100 includes a cylindrical housing 104 made of plastic or any other suitable material with a hinge 102 that extends along the long axis of the housing 104. The hinge 102 allows the housing 104 to open (FIG. 1A) and close (FIGS. 1B-1D) like a clamshell. One or more tabs 106 extending from one edge of the housing 104 may engage one or more locking interfaces 108 (e.g., formed of catches, hooks, ridges, or slots) on another side or edge of the housing 104 to lock the housing 104 in a closed position.

Together, the hinge 102, tab(s) 106, and locking interfaces 108 enable tool-less, clamp-on installation around existing pipes or installed on newly laid pipes. This simplified clamp-on installation eliminates pipe cutting and pipe breaking, reduces labor costs, and reduces the risk of leaks and contamination associated with pipe cutting and pipe braking. In contrast, installing conventional in-line water meters requires shutting off the water, cutting the pipe, and inserting the meter in-line. For multi-family buildings, this may mean draining the entire building to install the meters, leading to long, inconvenient downtimes. The bigger the building, the greater the time the building may be without water.

In some cases, the locking interface 108 may include multiple catches or slots to hold the housing 104 closed in one of many positions to accommodate pipes 10 of different outer diameters or shapes. The hinge 102 may also be articulated to accommodate pipes 10 of different diameters (e.g., diameters of about 0.5 inches to about 1.0 inches) or shapes. The meter 100 can work with any suitable type of pipe, including copper pipes, PVC pipe, and even PEX tubing.

The fluid flow meter 100 also includes a transmit (Tx) ultrasonic transducer 110 and a receive (Rx) ultrasonic transducer 110b (collectively, transducers 110), each of which sits within a respective transducer housing 112a, 112b (collectively, transducer housings 112). Each transducer 110 may include a piezoelectric device (e.g., a thin-film or disk device) as known in the art. In some cases, each transducer 110 may be configured to only transmit or receive ultrasonic signals; in other cases, each transducer 110 may be configured to transmit and receive ultrasonic signals, e.g., in an alternating fashion.

Figure 1B:
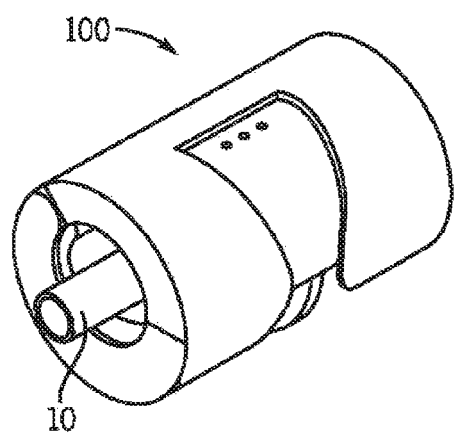
Figure 1C:
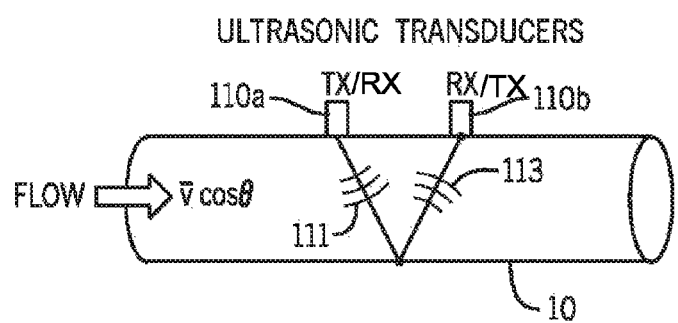
FIG. 1C shows the positions of the ultrasonic transducers in the ultrasonic fluid flow meter of FIGS. 1A and 1B when the meter is installed around a pipe.
Figure 1D:
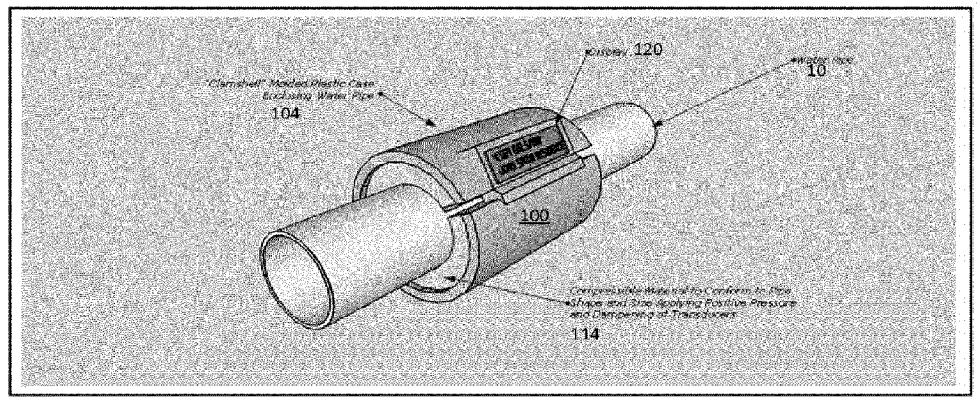
FIG. 1D shows an ultrasonic flow meter installed around a pipe.

Once the fluid flow meter 100 is installed properly (e.g., as shown in FIGS. 1B-1D) and 1C), each transducer 110 is oriented at an angle (e.g., 15°, 30°, 45°, or 60°) with respect to the pipe's longitudinal axis. A compressible or conformal cushion 114 disposed on or along the inside of the housing 104 may cushion and secure the transducers 110 with respect to the pipe 10. The cushion 114 may also apply positive pressure to the transducers 110 and dampen vibrations of the transducers 110. In some cases, the cylindrical housing 104, the transducer housings 112, or both may include adjustment mechanisms, such as set screws or levers, to adjust the angle (s) of the transducers 110 with respect to the pipe. For instance, a plumber, installation technician, or even a consumer may adjust the set screws to maximize the signal-to-noise ratio of the signal detected with the transducers. The meter 100 can be powered by a battery, a power line, or, if installed outdoors, a solar cell. Example meters 100 may also have a passive wake-up feature for power reduction; that is, they may only draw power when water flows through the meter.

Figure 4A:
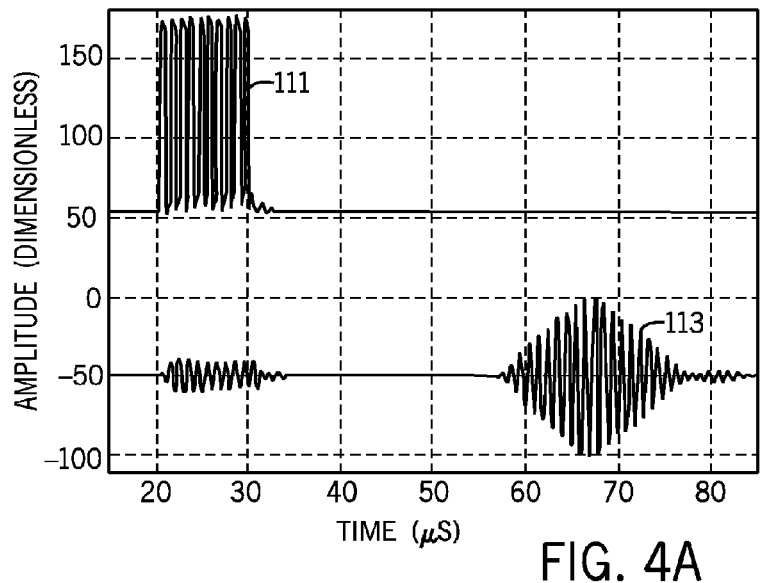
FIG. 4A is a plot of a transmitted ultrasonic pulse (top) and a received ultrasonic pulse (bottom) of the ultrasonic fluid flow meter of FIGS. 1A and 1B.

In operation, the transmit transducer 110a transmits a signal, such as a modulated high-frequency burst, or pulse 111, into the pipe 10, as shown in FIG. 4A. Together, the transducers 110 may transmit pulses 111 upstream, downstream, or upstream and downstream in alternating fashion. The pulse 111 propagates through the fluid in the pipe 10, then reflects or scatters off bubbles, particles, or debris within the pipe 10 or the inner wall of the pipe 10 itself. The reflected or scattered pulse 113 (also shown in FIG. 4A) propagates along a V-shaped (or W-shaped) path back to the receive transducer 110b, which detects a version 113 of the pulse that is delayed, attenuated, and possibly distorted compared to the transmitted pulse 111. Longer paths (e.g., with more reflections) increase the time delay, but may also lead to increased attenuation or distortion.

The length of the time delay varies with the velocity of the fluid relative to the pulse. When the fluid is not moving (a "no-flow" condition), the time delay equals the product of the pulse's speed and the pulse's propagation distance. When the fluid moves, the time delay increases or decreases by an amount proportional to the fluid's velocity with respect to the pulse. (The received pulse also shifts in frequency with respect to the transmitted pulse by an amount proportional to the relative velocity as understood by those of skill in the art.) Transmitting the pulse 111 upstream results in an increasing delay relative to no-flow for increasing flow rates; transmitting the pulse 111 downstream results in an increasing advance relative to no-flow for increasing flow rates.

The fluid flow meter 100 may also include a processing system, operably coupled to the transducers 110, that estimates the fluid's velocity and a display 120, that shows the flow rate, meter status, and other parameters. As understood by those of skill in the art, the processing system may include digital components, analog components, or a combination of analog components. It may include purpose-built components (e.g., an application-specific integrated circuit) or programmable/reconfigurable components (e.g., a field-programmable gate array or a field-programmable analog array).

Figure 2:
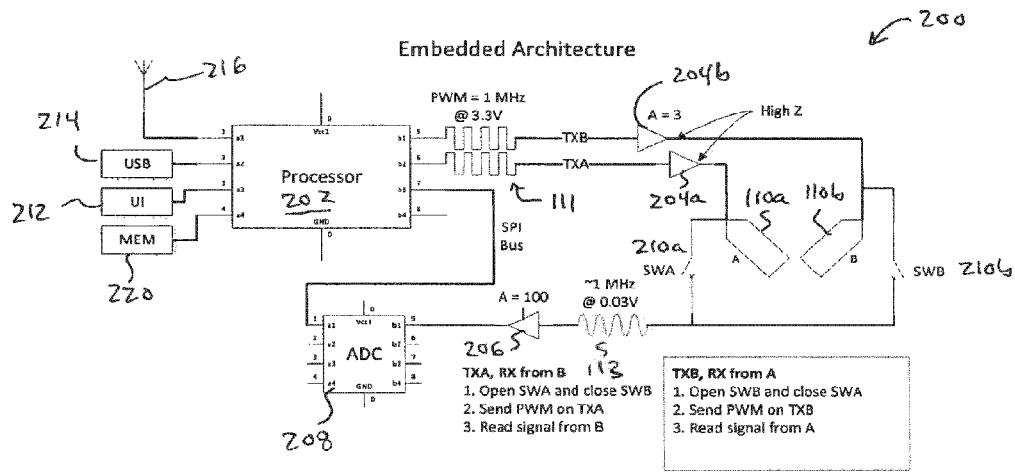
FIG. 2 is a block diagram that illustrates electronic components in the ultrasonic fluid flow meter of FIGS. 1A and 1B.

In some examples, the processing system estimates the fluid's velocity by either measuring the time that reflected pulse crosses a pre-determined threshold or by comparing a representation of the reflected pulse to one or more pre-determined templates, each of which represents a different fluid velocity. (Alternatively, the transmit transducer 110a may emit a continuous-wave (cw) or chirped signal, and the receive transducer 110b may detect a delayed version of the cw or chirped signal. In such an example, the processing system can determine the flow rate by measuring the frequency shift or the difference in phase (phase delay) between the transmitted and received cw or chirped signals.) The relationship between flow rate and time-delay-of-arrival (or frequency shift) is linear at the flow rates of interest (e.g., within a range of about 0 gallons per minute and about 1 gallon per minute, about ¼ gallon per minute, about ½ gallon per minute, about ¾ gallon per minute, etc FIG. 2 illustrates a processing system 200 suitable for use in or with the fluid flow meter 100 of FIGS. 1A-1C. The processor 202 collects data, including flow rate data, from the transducers 110 and either stores the data in local memory 220, transmits the data to a remote memory or server, or both. In some embodiments, the processor 202 transmits the data to a server (not shown) via a wireless communications interface 216 (e.g., a Zigbee, Bluetooth, or Wi-Fi interface).

The processing system 200 includes a processor 202 (e.g., an Atmel® Atmega128 microcontroller) that is coupled to a user interface 212 (e.g., a touchpad, one or more buttons, or one or more switches), a universal serial bus (USB) 214, a wireless communications interface 216 (e.g., a Zigbee interface), and a memory 220. The user interface 212 may be coupled to or include the display 120 shown in FIG. 1D. The processor 202 generates ultrasonic transmit pulses 111 and processes digital representations of the received pulses 113. The processor 202 is coupled to the transducers 110a and 110b via a pair of amplifiers 204a and 204b (collectively, amplifiers 204), respectively, that amplify the transmit pulses 111. Each transducer 110a, 110b is coupled to another amplifier 206 via a respective switch 210a, 210b (collectively, switches 210); the switches 210 connect to an analog-to-digital converter (ADC) 208. The processing system 200 may also include one or more filters (not shown) coupled to the amplifier's input or the ADC's input. Together, the amplifier 206, the ADC 208, and the filters form a front end that amplifies, filters, and digitizes the transducer output (measurement signal) and provides the resulting digital signal to the processor 202, which may analyze the digital signal, and display the estimated flow rate or flow velocity on the display 120 (FIG. 1D).

In general, the fluid flow meter 100 may have a variety of normal operating modes, including but not limited to sense, wake, idle, sleep, and transmit, and an error mode. It may also have a bootloader mode to install field-updateable firmware via either USB or wireless link and one or more configuration modes to set configuration properties after meter installation. TABLE 1 describes several exemplary operating modes:

TABLE 1

Fluid Flow Meter Operating Modes

| Operating Mode | Operating Mode Description |
| --- | --- |
| Sense | The wireless meter is transmitting and receiving ultrasound signals to determine water flow in a pipe and storing the data locally |
| Transmit | The wireless meter is transmitting data to the wireless hub |
| Wake | The wireless meter is fully active and awaiting instructions |
| Idle | The wireless meter is maintaining a wireless communication link, but all peripherals and main MCU core are shutdown |
| Sleep | The wireless meter is fully shut down and waiting for a timer interrupt or external interrupt |
| Error | The wireless meter is continually transmitting an error code and waiting for corrective response from the system |
| Bootloader | The wireless meter is waiting for wireless or USB instructions to reprogram program memory space with updated firmware |
| Configuration | The wireless meter is waiting to be configured following installation |

Figure 3:
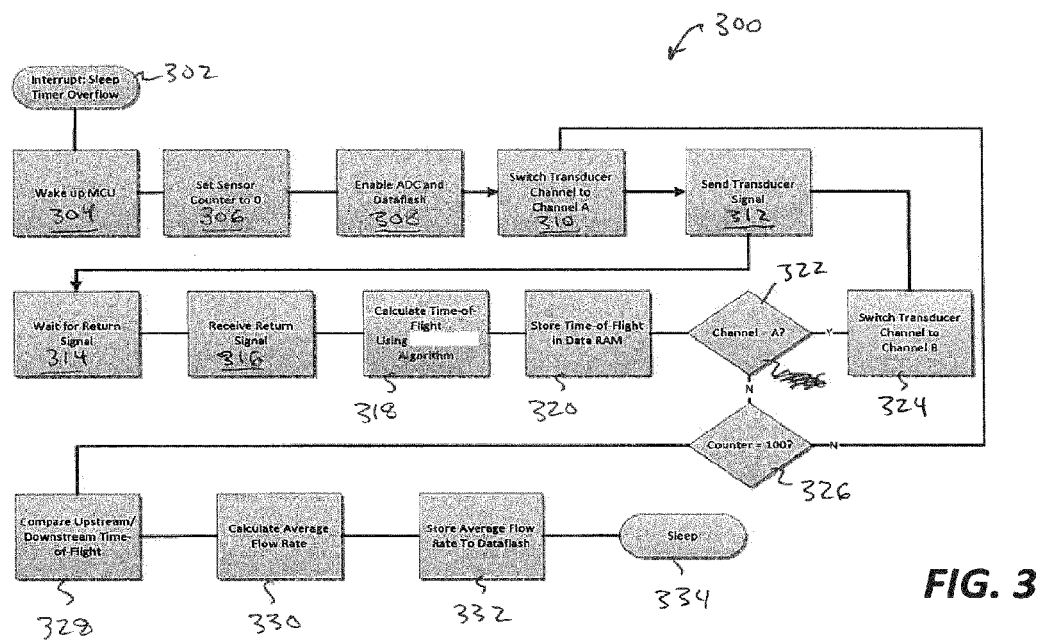
FIG. 3 is a flow diagram that illustrates operation of the fluid flow meter of FIGS. 1A and 1B.

FIG. 3 is a flow diagram 300 that illustrates operation of the flow meter 100 (and processing system 200). In step 302, an interrupt signal, such as a timer overflow signal, wakes the processing system 200 from a low-power mode, or sleep state. The processing system 200 responds to the interrupt signal by waking the microcontroller unit (MCU; processor 202) in step 304. Once awake, the processor 202 sets a counter to zero in step 306 and enables the ADC 208 and memory 220 (e.g., flash memory) in step 308.

Once the processing system 200 is fully enabled, the flow meter 100 is ready to measure the velocity of the fluid flowing in the pipe 10. Before transmitting any pulses, the processor 202 either queries the transducer channel, selects a transducer channel (e.g., channel A for transducer 110a) by opening and closing the switches 210 as appropriate, or both in step 310. In step 312, the processor 202 generates the transmit pulse 111, which is amplified by amplifiers 204, and drives the transducers 110, at least one of which emits the ultrasonic pulse 111 into the pipe 10. After a brief delay in step 314, the selected transducer 110a receives the reflected or scattered pulse 113 in step 316. The amplifier 206 amplifies the output signal from the selected transducer 110a, and the ADC 208 digitizes the output of the amplifier 206 and provides the digitized output to the processor 202.

In step 318, the processor 202 calculates the time delay, or time-of-flight, associated with the pulse's propagation through the pipe, e.g., using a Goertzel infinite impulse response (IIR) algorithm or any other suitable technique. The processor 202 stores a representation of the time-of-flight in a data random access memory (RAM), such as one provided by the memory 220, in step 320. The processor 202 may also transmit information relating to the time-of-flight, including an estimate of the fluid velocity, to a user via the user interface 212 or to a server or other device via the USB 214 or the wireless communications interface 216.

In step 322, the processor 202 queries the transducer channel setting; depending on the query result, the processor 202 either switches from one transducer channel to the other in step 324, then repeats steps 312 through 322, or queries a counter in step 326. By switching between transducer channels, the fluid flow meter 100 can make upstream and downstream time-of-flight measurements. The counter, which may be internal or external to the processor 202, determines how many transmit/receive cycles that the fluid flow meter 100 performs in response to the interrupt signal (step 302). In the example shown in FIG. 3, the fluid flow meter 100 is set to perform 100 fluid flow velocity measurements (100 transmit/receive cycles). Other settings may be possible as well (e.g., 1, 5, 10, 25, 50, 250, etc.). Those of skill in the art will readily appreciate that it generally takes more time to make more measurements, but that making more measurements generally improves the accuracy of the resulting velocity estimate.

If the processor 202 determines that the measurement count equals or exceeds the count in the counter in step 326, it proceeds to compare the upstream and downstream time-of-flight measurements obtained with the transducers 110. For instance, the processor 202 may subtract the upstream measurements from the downstream measurements (or vice versa) to cancel the fixed (no-flow) time delay associated with the pipe 10. In step 330, the processor 202 calculates an average flow velocity (and flow rate) responsive to the comparison of the upstream and downstream time-of-flight measurements. The processor 202 stores representations of the average flow rate, average flow velocity, and/or time-of-flight measurements in memory 220 in step 332. The processor 202 may then return to sleep mode in step 334.

Fluid Flow Signal Processing Using Templates

The processor 202 may use any suitable technique to estimate the flow rate or velocity of the fluid in the lumen defined by the pipe 10. In one example, the processor 202 estimates the fluid velocity based on the time it takes an ultrasonic signal, or pulse 111, to propagate from one transducer 110a to the other transducer 110b; changes in the flow rate cause the time delay to change by a corresponding amount. As noted above, the transducers 110 can transmit pulses 111 upstream, downstream, or alternate between both upstream and downstream transmission. Using an upstream/downstream differential approach reduces inaccuracy due to variations in the no-flow time delay (the reference time delay) with temperature, fluid pressure, fluid density, or other conditions. Differences in time-of-arrival relative to zero-flow or between upstream and downstream measurements correspond to flow rate.

FIG. 4A is a plot of a transmitted pulse 110 and a received pulse 113 (amplitude versus time). The transducers 110 may emit pulses at a carrier frequency of about 100 kHz to about 10 MHz (e.g., about 1 MHz). The pulse duration may be about 5 µs to about 20 µs (e.g., about 10 µs). In some cases, the transducers 110 may emit and receive individual pulses 111, 113 or groups of pulses 111, 113 at a pulse repetition frequency of about 5 Hz to about 50 Hz (e.g., about 10 Hz to about 20 Hz) or at intervals of anywhere from 100 µs to minutes or hours. As understood by those of skill in the art, the duty cycle should be chosen to prevent a received pulse from overlapping or interfering with a subsequently transmitted pulse at the receive transducer 110b.

Figure 4B:
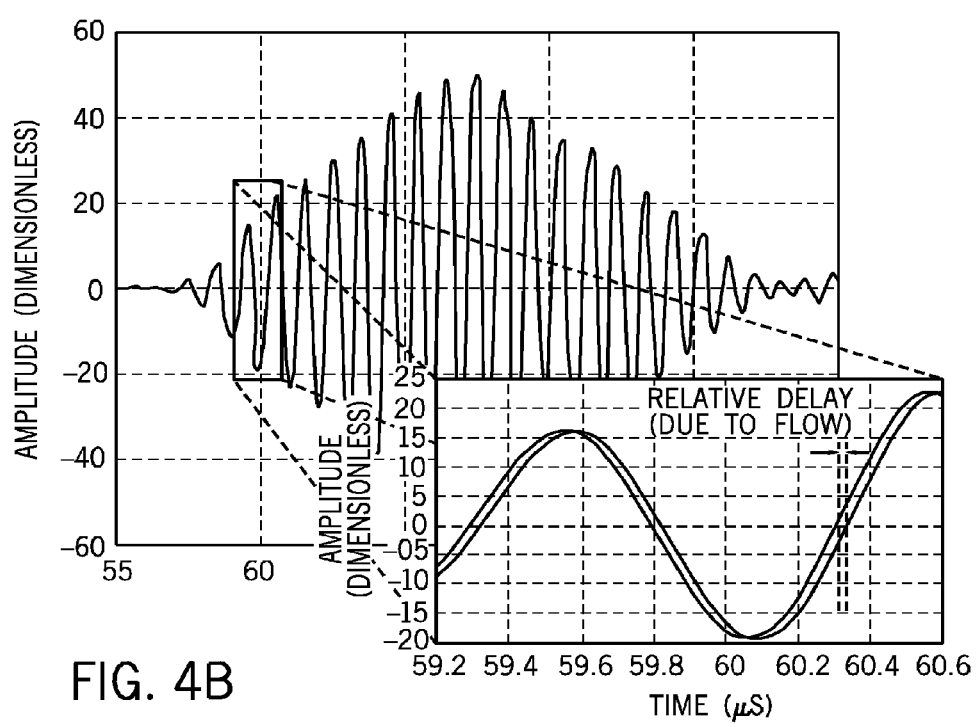
FIG. 4B is a plot that shows the delay between two received ultrasonic pulses associated with different fluid flow velocities.

FIG. 4B is a plot that illustrates how changing fluid velocity affects a pulse's time-of-flight. It shows two received pulses separated by a delay of about 0.04 μs (inset), which corresponds to a difference in in flow rate of about 3.64 gallons per minutes. Increasing the difference in flow rate causes the relative delay to increase, and decreasing the difference in flow rate causes the relative delay to decrease. Changes in the pipe's temperature, diameter, and inner surface may also affect the time delay (and the flow rate), as may changes in fluid density and temperature. For instance, under other conditions, a difference in flow rate of 1 gallon per minute may yield a difference in time delay of about 4 ns to about 5.

As described above, the processing system 200 amplifies and digitizes the received pulse 111 to produce a measurement signal representative of the pulse's time-of-flight (and, implicitly, the fluid's velocity). In some embodiments, the processor 202 compares this measurement signal to one or more predetermined templates that represent different times-of-flight. For instance, the processor 202 may cross-correlate the measurement signal with each of the one or more templates, e.g., by Fourier transforming the measurement signal, multiplying it with the Fourier transform of each template, and inverse Fourier transforming the resulting product. The resulting cross-correlation may include a peak indicative of a match between the estimated flow velocity (e.g., as represented by the time delay) associated with the measurement signal and the estimated flow velocity associated with the template. The processor 202 may estimate the flow velocity by comparing the measurement signal to only one template (e.g., a template that represents a no-flow condition) and determining the mismatch (e.g., shift in cross-correlation peak) or by comparing the measurement signal to several templates and picking the best match (e.g., the largest cross-correlation peak). In some cases, the processor 202 may interpolate between closely matching templates to improve the measurement precision.

FIGS. 5A and 5B are a line plot and an image plot, respectively, of templates representing different time delays (and hence different estimated flow velocities). Each template is an apodized pulse that has been shifted with respect to the its neighboring templates by a predetermined amount, e.g., about 0.1 μs. The templates are normalized such that only wave-shape matters; they may also be filtered to match the distortion in the received pulse 113 caused by the pipe and fluid. The processing system 202 may store any suitable number of templates, e.g., 1, 10, 100, or 1000 templates. The templates may be evenly distributed across a predetermined time interval, distributed more densely around certain time delays (e.g., time delays that represent common flow velocities), distributed randomly throughout the predetermined time interval, or distributed in any other suitable fashion. The templates may be regenerated or rearranged as desired.

In some cases, the templates may be created at a sampling frequency (e.g., about 1 Gsps) that is higher than the processing system's sampling frequency (e.g., about 100 Msps). In these cases, the templates are down-sampled to the processing system's sampling frequency, as shown in FIGS. 6A and 6B, to reduce the amount of space that they take up in the memory (e.g., memory 220) and to increase processing speed as understood by those of skill in the art. Comparing the measurement signal to the down-sampled templates shown in FIG. 6B yields the cross-correlation peaks shown in FIG. 6C, where the darker regions indicate better matches. The processor 202 determines the row number (index) corresponding to the best match (high peak), matches the row number to the corresponding template (e.g., using a look-up table stored in memory 220), and estimates the fluid velocity based on the corresponding template.

In some examples, the processor 202 finds the template that best matches the measurement signal by taking a single inner product of the measurement signal, represented as a measurement vector, with the templates, represented as a matrix (e.g., as plotted in FIGS. 5B and 6B). The resulting inner product is a match vector whose length (number of elements) equals the number of templates. If the measurement vector and the templates are normalized, the elements of the match vector take real values between −1 and +1. The element with the value closest to +1 corresponds to the template that best matches the measurement vector; in turn, matching template's velocity best matches the fluid velocity.

In other examples, the processor 202 computes a "sliding" inner product of the measurement vector with the rows of matrix. Put differently, the processor 202 computes the cross-correlation of the measurement vector with each template in a process similar to matched filtering. To compute the cross correlations, the processor 202 creates multiple, overlapping windows representing the incoming signal, e.g., by dropping one or more the oldest samples of a given window, shifting the remaining samples in the window, and adding new samples at the end of the window. This process yields a sequence of vectors, where the row corresponding to the maximum over the vectors in the sequence corresponds to the best-matching template (and corresponding flow rate). Those skilled in the art will readily appreciate other methods of processing the measurement signal to estimate the fluid velocity, including, but not limited to both analog and digital signal processing techniques.

Interpolation and Dithering to Increase Precision

The processor 202 may also interpolate the measurement signal, one or more of the templates, or both the measurement signal and the templates to increase the precision of the fluid velocity estimate. For instance, if the measurement signal matches two templates (nearly) equally well using the techniques described above, the processor 202 may interpolate between the templates to determine a more precise velocity estimate. The processor 202 may also up-sample the measurement signal using, e.g., using sinc or cubic-spline interpolation to increase the processing system's effective sampling frequency. The processor 202 may then correlate or otherwise compare the up-sampled measurement to one or more templates sampled at the same high frequency.

The processor 202 may also "dither" the amplitudes of the measurement signals, the templates, or both to improve the precision of the velocity estimate. To dither these signals, the processor 202 adds a random waveform from a distribution of a given variance, determined by the separation between adjacent time bins, to the measurement signal. For instance, the processor 202 may draw the random waveform from a white Gaussian noise process at predetermined variance. It also adds an uncorrelated random waveform drawn from distributions of the same variance to each of the templates. (If desired, the random waveforms may be added to the templates before the templates are loaded into the fluid meter's memory 220.)

To see how dithering improve measurement precision, consider a fluid flow velocity that falls partway between the fluid flow velocities associated with a pair of adjacent templates. By matching the measurement signal to the templates, the processor 202 effectively "quantizes" the measurement signal's time-of-flight, just as an ADC quantizes the amplitude of an analog signal. This quantization process imposes quantization error, which is the difference between the measurement signal's actual time-of-flight and its estimated time-of-flight (the time-of-flight associated with the matching template). Adding a small amount of noise to the measurement signal causes the quantization error to vary. If the noise distribution is symmetrical, then adding noise is just as likely to increase the quantization error as it is to decrease the quantization error. For a measurement signal whose time-of-flight is partway between the times-of-flight of adjacent templates, the noise will, on average, make the measurement signal more likely to match the closer of the two templates, improving the measurement precision.

Fluid Flow Meter Installation

Figure 7:
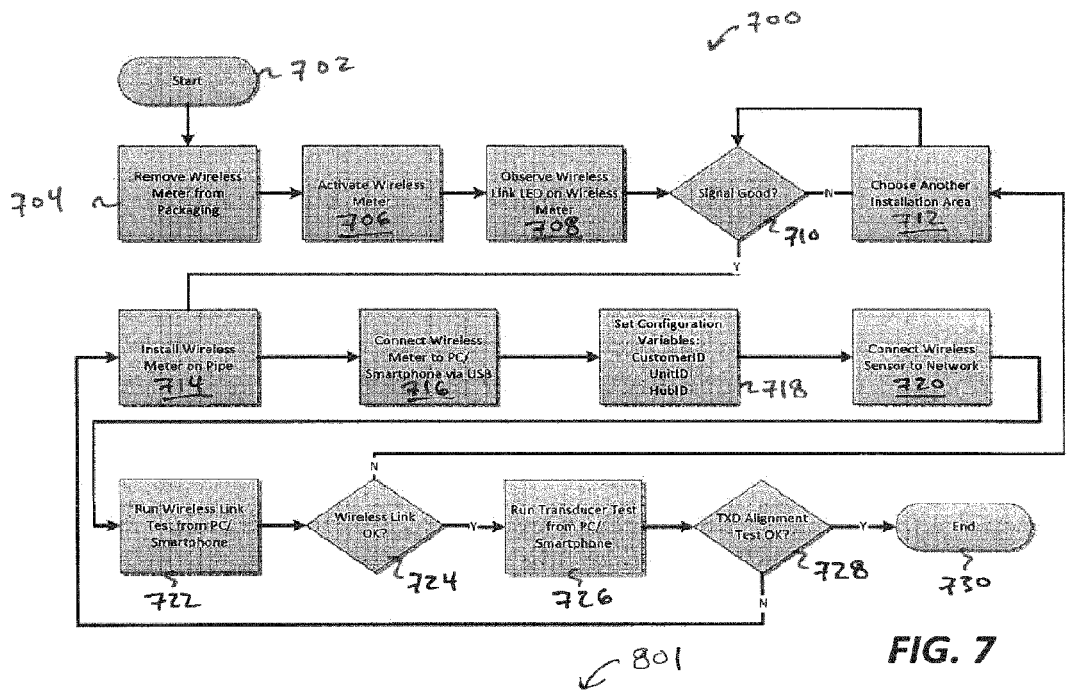
FIG. 7 is a flow diagram that illustrates installation of a fluid flow meter.

FIG. 7 is a flow diagram that illustrates an installation process 700 for the fluid flow meter 100 shown in FIGS. 1A-1C. The process 700 starts in step 702, when a plumber or installation technician identifies or selects the pipe to be monitored with the fluid flow meter 100. The technician removes the meter 100 from its packaging in step 704 and activates the meter 100 in step 706, e.g., by connecting it to a power supply. Once the meter 100 is active, the technician determines the strength of the wireless signal received by the meter's wireless communications interface 216 (step 708), possibly by observing a light-emitting diode (LED) or other indicator on the meter's user interface 212. If the technician determines in step 710 that the signal is too weak to support reliable wireless communications, he or she chooses an installation area with better reception for the wireless communications interface 216 in step 712, then checks the signal strength again in step 710. The technician may repeat steps 710 and 712 as necessary or desired.

If the signal is strong enough, the plumber or technician installs the fluid flow meter 100 on the pipe 10 in step 714, e.g., by clamping the fluid flow meter 100 around the pipe 10 as shown in FIGS. 1A and 1B. The technician then connects the fluid flow meter 100 to a computing device, such as a computer, tablet, or smartphone, via the fluid flow meter's USB 214 in step 716. In step 718, the technician configures the fluid flow meter 100 using the computing device, possibly by setting a customer identification; a building, apartment, appliance, or other identification; and a network connection (hub) identification for wireless network.

In step 720, the technician connects the fluid flow meter 100 to the wireless network, e.g., by entering appropriate identification and authentication information via the computing device. The technician tests the wireless connection between the fluid flow meter 100 using the computing device in step 722 and evaluates the test results in step 724. If the test results indicate an unacceptable connection between the fluid flow meter 100 and the network, the technician may uninstall the fluid flow meter 100 and choose another installation area. If the test results are good, the technician tests the transducers 110 using a calibration program on the computing device. This test may yield information, such as received pulse strength and pulse delay, that is evaluated in step 728 to determine the transducers' alignment relative to the pipe 10. If desired, the technician can align the transducers relative to the pipe 10, either by re-installing the fluid flow meter 100 (step 714), adjusting a transducer alignment mechanism (e.g., a set screw), or both. The installation process ends in step 730 in response to the technician's determination that the fluid flow meter 100 is installed properly.

In some examples, the transducer test in step 726 may include measurements of the time delay associated with a no-flow state. The processing system 200 may use this residual time delay measurement as a reference point when estimating the fluid velocity. It may also use this measurement to estimate the pipe size; for a pulse propagating in a V-shaped path, the pipe diameter is approximately $D=v\sigma/(2\tan\theta)$, where v is the pulse velocity, r is the time delay, and $\theta$ is the angle between the pipe's longitudinal axis and the pulse's propagation path. In some cases, the calibration program or the processing system 200 may compare the estimated pipe diameter against a pipe diameter specified in building plans or a job order. If the estimated pipe diameter does not match the expected pipe diameter, the computing device or the fluid flow meter 100 may issue a warning or query, such as "Please check the pipe. The measured pipe diameter is 1.0 inches, but the expected pipe diameter is 0.75 inches. This may not be the correct installation location." A discrepancy between the estimated and expected pipe diameters could also indicate build-up or debris inside the pipe 10. (In some cases, the fluid flow meter 100 may be configured to monitor the pipe 10 for gradual or sudden changes in the pipe's inner diameter and to report these changes via its wireless communications interface 216.)

The fluid flow meter 100 may be configured to calibrate itself using readings from the main water meter, branch water meters (including meters within the same building), and/or data from the water usage database. Self-calibration creates a network that is capable of identifying leaks with great accuracy with respect to their location within the network while also being capable of identifying loss due to theft or tampering with the same accuracy.

Fluid Metering System Architectures and Operation

Figure 8A:
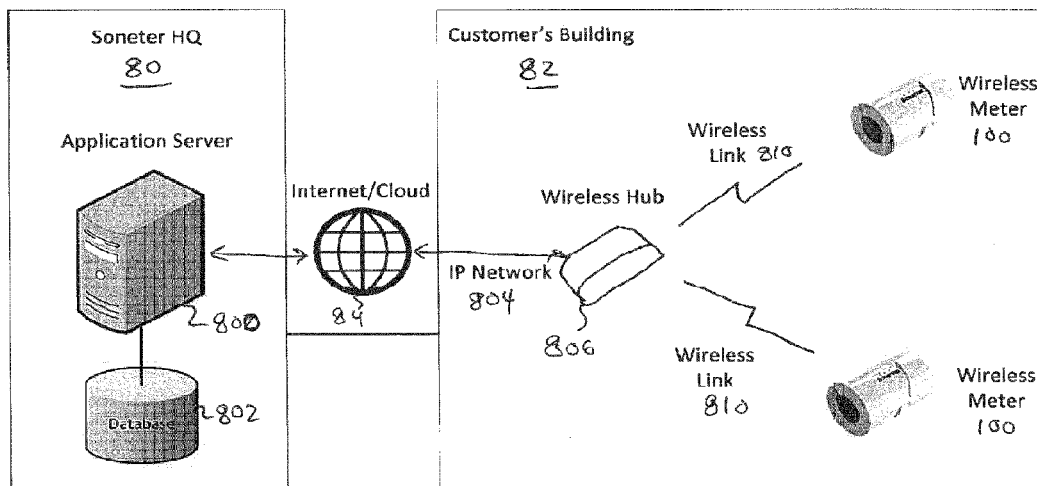
FIG. 8A illustrates an architecture of a fluid metering system.

Once installed properly, one or more fluid flow meters 100 in a customer's building 82 may be connected to a network a server 800 in an off-site location 80 to form an intelligent fluid flow sensing network 801 as shown in FIG. 8A. As described above, each fluid flow meter 100 can be connected to a wireless hub 806 via a respective wireless link 810 during installation. The wireless hub 806 connects to an internet protocol (IP) network 804, which in turn connects to the application server 800 via the Internet 84. The application server 800 may connect to a database 802; it may also connect to other devices, such as customer computers or smartphones, either directly or via the Internet 84 or any other suitable communications network. Those of skill in the art will readily appreciate that the intelligent fluid flow sensing network may have any other suitable network architectures and that the network components, such as the server 800, database 802, and wireless hub 806 may be located in any suitable location.

The server 800 may communicate periodically or on-demand with each fluid flow meter 100 in the intelligent fluid sensing network. For instance, the server 800 may transmit a status query (e.g., operating status, leak detection status, etc.) or firmware update to each fluid flow meter 100 on a regular or semi-regular basis. The fluid flow meters 100 may transmit responses or acknowledgements to the server's queries. They may also transmit fluid usage data, including, but not limited to estimated flow velocities, estimated flow rates, the number of flow events (e.g., how often water flowed through the pipe 10 in a given period), the duration of each flow event (e.g., how long the water flowed through the pipe 10), recent user commands, etc.

Upon receiving the data from the processor, the server 800 stores the data in a water usage database 802. Engines (possibly embodied as computer-readable instructions on a non-volatile storage medium) compute water usage statistics and present these water usage statistics to homeowners, renters, building owners, property managers, utilities managers, and other users via management dashboards. These dashboards can be displayed via web browsers or special-purpose applications on computer monitors, smart phones (e.g., iPhones, Blackberries, and Droids), laptop computers (including iPads and other tablet computers), or any other suitable display. The meters may be combined with smart manifold sensors (described below) to form a distributed sensor network that can be used to meter individual units in an apartment complex, individual businesses in a shopping mall, or individual homes and businesses in a utility service area. Data collected from such a distributed sensor network provides information on aggregate water usage, individual water usage, and statistics and patterns related to water usage in a given building or water usage zone.

Figure 8B:
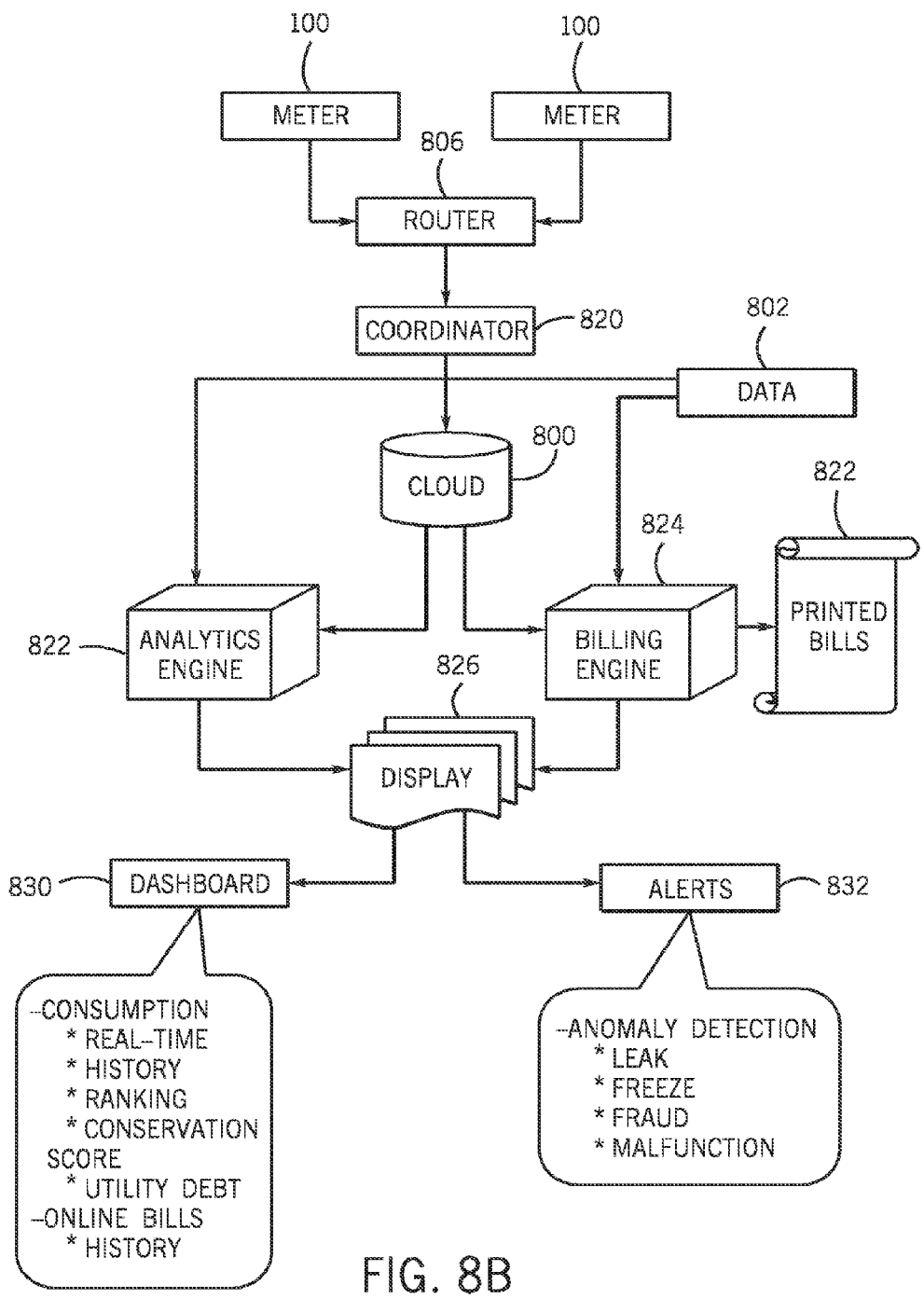
FIG. 8B illustrates the server and the fluid metering system shown in FIG. 8A.

FIG. 8B is another view of the intelligent fluid (water) flow sensing network 801 shown in FIG. 8A. As described above, the system 801 includes one or more fluid flow meters 100 attached to pipes 10 (not shown). The fluid flow meters 100 communicate with the server 800 via a router or hub 806, which communicates with the server/cloud 800 via a coordinator or gateway 820. The server/cloud 800 and the database 802 feed information, including estimated flow rates and flow velocities, to an analytics engine 822, which is coupled to a display 826. The analytics engine 822 computes water usage, water usage trends, peer rankings, and even a "conservation score" that corresponds to a user's water usage and can be used for water usage rankings. The analytics engine 822 may also be set to detect leaks, freezes, malfunctions, and fraud based on water usage (e.g., a sudden a dramatic increase in water usage may indicate a leak). The analytics engine 822 may provide information relating to water usage via one or more dashboards 830 (discussed below) and via alerts 832 presented on the display 826. These dashboards 830 may be used to enforce a fair water consumption policy based on household information, including the number of occupants, occupants ages, type of house or apartment, time of year, location, weather, etc. The analytics engine 824 may also compute and assign metrics to different properties for insurance purposes based on past histories of leaks or freezes.

The server/cloud 800 and the database 802 also feed information, including estimated flow rates and flow velocities, to a billing engine 824 that is coupled to the display 826. The billing engine 826 produces both printed bills 828 and electronic bills, which may be displayed via the dashboards 830 and alerts 832. For example, the billing engine 826 may determine how much a user has left in his or her budget and project the number days to exceed budget based on present or historic consumption rates. It may also notify the user, via the dashboard 830 or alerts 832, about the amount remaining in the budget, e.g., using thresholds set the user. In addition, the billing engine 826 may enable flexible payment schedules: the user can choose a date up to which he or she want to pay the utilities, with a minimum mandatory payment. It also enable users and utilities to create a "utility debt" metric and a "resident lease score," similar to credit score, which relates to the utility debt track record. Leasing agents, property managers, and property owners may check a prospective or current tenant's utility debt or resident lease score when reviewing a lease application.

FIGS. 8C-8G show a smartphone 850 displaying various screens associated with a water use dashboard provide by the smart water networks illustrated in FIGS. 8A and 8B. (Those of skill in the art will readily appreciate that dashboards may be displayed on other devices, including desktop computers, laptop computers, table computers, and even the fluid flow meter 100.) The dashboard provide real-time and historic data and analysis of a water usage measured by one or more water meters 100 or smart manifolds (discussed below).

These dashboards enable occupants to track their consumption history and related statistics. They can also view the "health" of their apartment in terms of leak or freeze. Once an occupant has launched a dashboard application and logged in, he or she can view a water consumption history and a peer or local rating; download water usage analytics, profile, and usage summary; search bills by date, amount, and payment status; search consumption by date and amount; and compare usage for any day, week, month, or year.

Similarly, the dashboards enable property owners and managers to view each consumption details by apartment or unit, community, and common area. They also show a unit's "health," e.g., in terms of its leak/freeze conditions. Once the owner or manager has launched the dashboard application and logged in, the owner or manager can also download summaries of usage details, notify tenants of leaks or excessive consumption (e.g., via email or text message), create custom reports for individual tenants (or by building or the whole community), and view water usage rankings by region, state, or country.

In addition, a smart water network administrator may remotely manage one or more of the devices (e.g., meters and manifolds) on the network. They can also access dashboards to monitor cumulative consumption details at community and regional levels as well as one or more of the associated individual dashboards available to occupants, owners, and property managers.

Figure 8E:
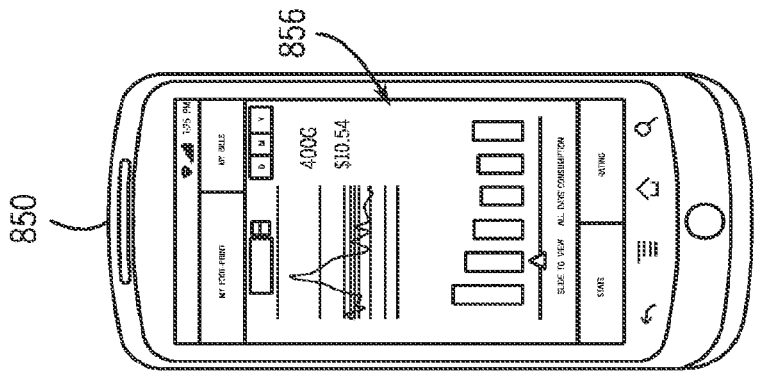
Figure 8D:
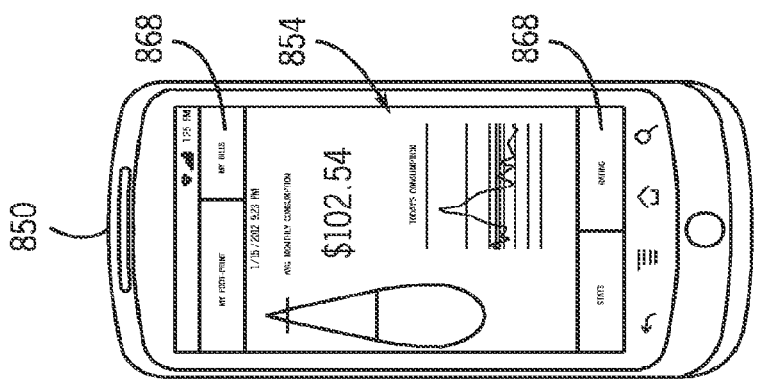
Figure 8C:
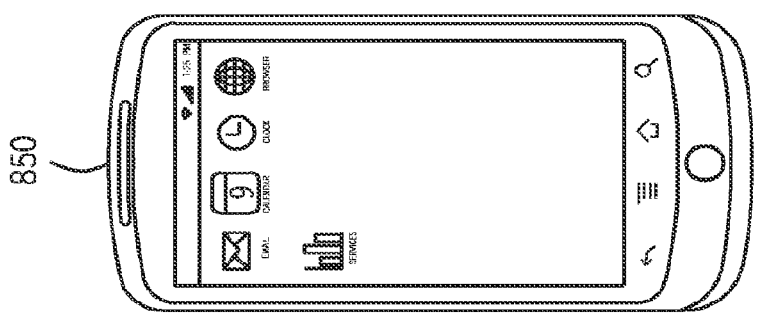

To access the dashboard, the user launches a dashboard app or program by selecting an appropriate icon 852 displayed on the smartphone 850, as shown in FIG. 8C. The smartphone 850 may display a brief welcome screen (not shown) before displaying menu bars 868 that enable the user to select one of several displays and home dashboard 854, shown in FIG. 8D, that shows the latest water consumption, monthly water usage status, daily water breakdown, bill amount (e.g., in dollars), and alert status. In the event of a leak, the home dashboard 854 may automatically notify building maintenance or provide the user with a list of reputable area plumbers to fix the leaks. In addition, the "Home" dashboard 854, like the other dashboards shown in FIGS. 8C-8G, may be used to refresh the display or to change user information.

The user may select a consumption statistics/history dashboard 856, shown in FIG. 8E, or a consumption rankings/ratings display 858, shown in FIG. 8F, to check or compare his or her usage history. These dashboards 856 and 858 enable the user to check consumption history, compare usage, and download usage reports. They also illustrate comparisons and rankings within and among social networks, neighborhoods, cities, counties, states, and nationwide using water usage statistics derived from flow rate sensor data. It also allows the user to calculate and compare water footprints, to visualize water usage data, to compute variance in water usage for a given fixture or building, and to view rewards for low consumption and/or for reducing consumption. The consumption rankings/ratings display 854 may also enable the user to: (1) check his or her consumption rating, conservation score, share ratings, or total savings; and (2) simulate usage and savings.

FIG. 8G shows select a "My Bills" dashboard 860 that shows current and previous water bills, including charges and water usage amounts. The "My Bills" dashboard 856 also enables the user to pay or download his or her bill. The user can also check the billing history and search bills using a "My Bills—Billing History" dashboard 862 as shown in FIG. 8H.

In some cases, the server 800, fluid flow meter 100, or smart manifold may be preloaded with amounts (dollars) the consumer anticipates will be used each month and notified of amount used for budgeting. For example, the "My Bills" dashboard 856 may display the budgeted amount and the balance remaining. Amounts may be carried over to the next month, just as minutes are carried over in prepaid cell phones. The dashboard 856 also enables the user to add or subtract credits (dollars) to his or her balance. Prepaid amounts can also be deposited with the water company or property owner and used for payment of consumer usage.

Inventive flow-sensing meters and dashboards also enable water credits trading similar to the cap and trade system proposed for carbon emissions. Water pricing is based on a tier usage system. If consumers are aware of their consumption and know what they have yet to consume in a lower tier, they may elect to trade or sell the water they have yet to use in the lower tier to a person or business that is nearing a higher tier rate for that month. Immediate awareness of usage and remaining amounts give consumers the ability to trade/sell their remaining lower tier usage rates to higher consumers at the lower tier rates. It also gives consumers the ability to receive an additional reward from the sale of what they conserve to higher users. Higher users have the ability to purchase unused capacity at lower rates compared to the higher tier rates charged by the utility company. Knowledge of usage should promote conservation and result in greater rewards for those who conserve. Public utilities, property owners, and property managers may benefit as well due to overall lower consumption. A public exchange could be established in the city or private exchanges could be developed for multi-tenant buildings, such as apartment buildings and shopping malls, where tenants of the same building trade water credits.

Inventive dashboards may also provide advice about how to lower water use and alerts relating to the condition of the plumbing. For instance, inventive dashboards may provide instructions to reduce consumption by changing dishwasher or other appliance settings. An inventive dashboard may also notify the user that a particular appliance or fixture is malfunctioning or due for service and provide a corresponding service alert to the user, owner, or building manager. In addition, it could be used to query and review historical data concerning usage data and to estimate upcoming service and replacement dates for plumbing, appliances, etc.

Inventive dashboards may also recognize and alert users about changes in flow due to leaks, frozen pipes, flooding, malfunctioning appliances, and other maintenance conditions. Manifolds with flow rate sensors can also be used to detect unauthorized water use, e.g., in vacant apartments. The dashboard may also predict potentially damaging situations, such as freezing temperatures, by combining water usage data with data derived from other sources. The processor may also transmit alerts via the wireless interface to the fire department, emergency services, property owner, utility company, and/or insurance company when flow rate data indicates fire, flooding, or another disruption in service.

Manifolds with Built-in Flow Sensors

Other embodiments of the present technology include a smart water manifold that can monitor each plumbing device in a building and control individual lines if it detects a leak or freeze condition. An exemplary smart manifold may also be able to distinguish indoor usage from outdoor usage, eliminating the need for exterior irrigation and usage meters. Like the fluid flow meters described above, the smart manifold may be coupled to or form part of a smart fluid metering system that offers improved customer knowledge of consumption and increased water efficiency. Using a smart manifold (and smart fluid flow meters), utilities and utility customers may: disable wasteful or leaking devices remotely; visualize usage data behavioral economics; (instantly) access current and historical water use information at the device level; compare their usage to usage at similar buildings in their neighborhood, city, and state; compare their indoor and outdoor water use; and set up and receive water use alerts, messages and notifications.

A smart manifold plumbing system controls the distribution of hot and cold water using at least one manifold to channel water to different rooms and/or fixtures in a house, apartment building, shopping mall, or other structure. (Larger structures, such as apartment buildings, may include multiple manifolds, e.g., one manifold per apartment.) An example smart water manifold may be made of polyethylene, polyvinyl chloride (PVC), or copper pipe that defines a lumen with at least one inlet port and two or more outlet ports. In some cases, a single smart manifold may distribute both hot and cold water through separate hot and cold manifold chambers (lumens); in other cases, the smart manifold plumbing system may include separate hot and cold smart water manifolds. In either case, cold water enters the corresponding cold-water manifold or manifold chamber from the water main or service line, and hot water enters the corresponding hot-water manifold or manifold chamber from the water heater, which is also supplied by the water main or service line. The service line, water main, or water heater maintains water pressure in the manifold. A smart manifold may be installed near the water heater during construction for ease of access.

Each smart manifold (or manifold chamber) includes multiple output ports (outlets) that connect to flexible piping, such as cross-linked polyethylene (PEX) piping or any other piping that can bend without kinking PEX piping can be connected to the manifold output ports via quick connect fittings as known in the art of plumbing. The piping channels water from the manifold to individual fixtures, such as sinks, dishwashers, showers, bath tubs, toilets, and washing machines. Each outlet may also include a gate valve to stop water from flowing to a particular fixture, e.g., if the line breaks or the fixture is under repair. Gate valves may be controlled manually or automatically, e.g., in response to flow rate data collected by flow rate sensors integrated into the outlet ports. The number and size of the manifold output ports, type of fitting, type of gate valve, and type and size of piping depends on the specific installation, may depend on the particular structure.

Once the smart water manifold and piping are installed, the flow sensors in the smart water manifold can be activated to monitor water flow to the fixtures throughout the structure. In example smart water manifolds, each outlet port has a dedicated flow sensor, which may be an ultrasonic flow sensor or an impeller-based flow sensor. Another optional flow sensor may measure water entering the manifold from the service line or water heater via the manifold's inlet port.

Figure 9:
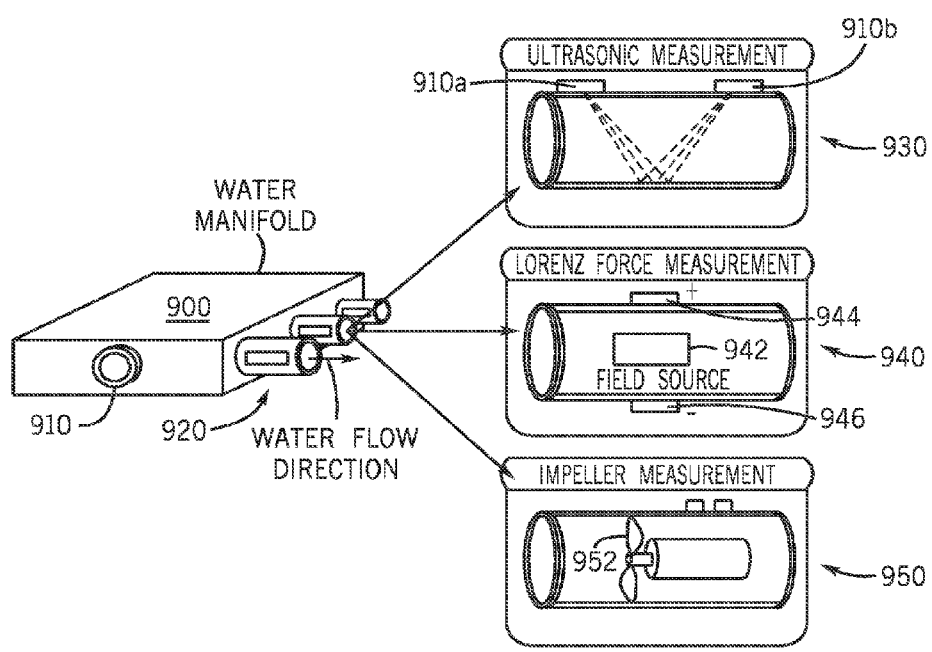
FIG. 9 is a diagram of a multi-port water manifold with flow sensors that can be integrated into any one of the water manifold's inlet and outlet ports.

FIG. 9 shows an example water manifold 900 with an inlet port 910 that can be coupled to a water main, service line, or water heater. Water enters the manifold 900 via the inlet port 910 and flows out of the manifold 900 to different rooms/fixtures via corresponding outlet ports 920, each of which can be connected to piping (e.g., PEX piping) via an optional quick connect fitting. At least one of the outlet ports 920 includes an integrated flow sensor that measures the flow rate of water flow out of the outlet port in question. (The inlet port 910 may also include a flow sensor.) The inlet port 910 and outlet ports 920 may include gate valves to limit or stop the flow of water into or out of the manifold 900.

Suitable sensors include an ultrasonic sensor 930 (e.g., as in the fluid flow meter 100 shown in FIGS. 1A-1C), a Lorentz force sensor 940, and an impeller sensor 950. In the illustrated example, the Lorentz force sensor 940 includes a magnetic field source 942 disposed in-line with the water flow, i.e., within an outlet lumen defined by the outlet port. Charged particles in the water flowing past the magnetic field source 942 create an electric field that varies with the flow rate. Electrodes 944 and 946 on opposite sides of the outlet lumen sense the variations in electric field to provide an indication of the flow rate. Example impeller sensors 950 may include an impeller blade 952 disposed in-line with the water flow, i.e., within an outlet lumen defined by the outlet port. Water flowing past the impeller causes the impeller to spin at rate proportional to the water flow rate. Alternative impeller sensors may include positive displacement, nutating disk, multi jet and turbine options as known in the art.

Each flow sensor may also be or include an ultrasonic transit-time flow meter that includes two (thin-film or disk) piezoelectric transducers as shown in FIG. 9: a transmit transducer (TX) 910a that transmits a high-frequency burst, or pulse, into the outlet port and a receive transducer (RX) 910b that detects a reflected version of the pulse after some time delay. (FIG. 4A is a plot of example transmitted and received pulses.) Pulses can be transmitted upstream, downstream, or upstream and downstream in alternating fashion. Transmitting upstream results in an increasing delay relative to no-flow for increasing flow rates; transmitting downstream results in an increasing advance relative to no-flow for increasing flow rates. A processor operably coupled to the flow sensors determines the return-time of the reflected pulse by either measuring the time that reflected pulse crosses a pre-determined threshold or by computing a correlation of the reflected pulse with a pre-determined limit and finding the temporal location of the maximum of the resulting correlation waveform. The relationship between flow rate and time-delay-of-arrival is linear at the flow rates of interest (e.g., within a range of about 0 gallons per minute and about 1 gallon per minute, about ¼ gallon per minute, about ½ gallon per minute, about ¼ gallon per minute, etc.).

Alternatively, the transmit transducer may emit a continuous-wave (cw) signal, and the receive transducer may detect a delayed version of the cw signal. The processor determines the flow rate by measuring the difference in phase, or phase delay, between the transmitted and received cw signals.

CONCLUSION

It should be understood that the systems described above may provide multiple ones of any or each of those components and these components may be provided on either a standalone machine or, in some embodiments, on multiple machines in a distributed system. In addition, the systems, methods, and engines described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

While the invention has been particularly shown and described with reference to specific embodiments, it should be understood by those skilled in the art that various changes in form and detail may be made therein without departing from the spirit and scope of the invention as defined by the following claims. For example, the manifolds disclosed herein may be used to monitor flow rates of fluids other than water, such as oil, gasoline, etc.

What is claimed is:

1. A fluid flow meter comprising:
   a sensor to detect an ultrasonic signal indicative of a velocity of a fluid flowing through a lumen and to provide a measurement signal indicative of the velocity based on the ultrasonic signal;
   a memory to store a plurality of templates, each template corresponding to a different possible velocity of the fluid compared to other templates and having a wave shape substantially matching a wave shape of the ultrasonic signal, wherein the templates are filtered to match a distortion associated with the ultrasonic signal caused by at least one of the lumen and the fluid; and
   a processor, communicatively coupled to the sensor and to the memory, to compute cross-correlation values for the measurement signal with each of the templates and to determine an estimated velocity of the fluid based on the cross-correlation values.

2. The fluid flow meter of claim 1 wherein the sensor comprises:
   (i) a first transducer to transmit the ultrasonic signal through the fluid flowing through the lumen;
   (ii) a second transducer to receive a reflected, scattered, or transmitted copy of the ultrasonic signal; and
   (iii) a front end circuit to produce the measurement signal from the reflected, scattered, or transmitted copy of the ultrasonic signal.

3. The fluid flow meter of claim 2 wherein:
   the ultrasonic signal is a first ultrasonic signal and the measurement signal is a first measurement signal,
   the second transducer is further configured to transmit a second ultrasonic signal through the fluid flowing through the lumen,
   the first transducer is configured to receive a reflected, scattered, or transmitted copy of the second ultrasonic signal,
   the front end circuit is further configured to produce a second measurement signal based on the reflected, scattered, or transmitted copy of the second ultrasonic signal, and
   the processor is configured to compute cross-correlation values for the first and second measurement signals with each of the templates and to determine an estimated velocity of the fluid based on the cross-correlation values for the first and second measurement signals with each of the templates.

4. The fluid flow meter of claim 1 wherein the templates are produced at a first sampling frequency and stored in the memory at a second sampling frequency lower than the first sampling frequency.

5. The fluid flow meter of claim 1 wherein the processor is further configured to interpolate at least one of the measurement signal and the templates.

6. The fluid flow meter of claim 1 wherein the processor is further configured to add a first random waveform to the measurement signal and a second random waveform to the templates.

7. The fluid flow meter of claim 1 further comprising:
   a fixation device to secure the sensor to a vessel that defines the lumen.

8. The fluid flow meter of claim 1 further comprising:
   a manifold defining the lumen, the manifold comprising:
     an inlet to channel the fluid into the lumen; and
     one or more outlets to channel the fluid out of the lumen,
   wherein the processor is configured to determine an estimate of the velocity of the fluid flowing into or out of the lumen.

9. The fluid flow meter of claim 1 further comprising:
   a communications interface, communicatively coupled to the processor, to transmit a representation of the estimated velocity or the measurement signal to a server.

10. A method of estimating a velocity of a fluid flowing through a lumen, the method comprising:
    (a) acquiring based on a received ultrasonic signal a measurement signal indicative of the velocity of the fluid flowing through the lumen;
    (b) computing cross-correlation values for the measurement signal with each of a plurality of templates, each template corresponding to a different possible velocity of the fluid compared to other templates and having a wave shape substantially matching a wave shape of the received ultrasonic signal, wherein the templates are filtered to match a distortion associated with the ultrasonic signal caused by at least one of the lumen and the fluid; and
    (c) determining an estimated velocity of the fluid based on the cross-correlation values.

11. The method of claim 10 wherein (a) comprises:
    (i) transmitting an ultrasonic signal through the fluid flowing through the lumen;
    (ii) receiving a reflected, scattered, or transmitted copy of the ultrasonic signal; and
    (iii) producing the measurement signal from the reflected, scattered, or transmitted copy of the ultrasonic signal.

12. The method of claim 10 wherein (a) comprises:
    (i) transmitting a first ultrasonic signal in a first direction through the fluid flowing through the lumen;
    (ii) receiving a reflected, scattered, or transmitted copy of the first ultrasonic signal;
    (iii) transmitting a second ultrasonic signal in a second direction through the fluid;
    (iv) receiving a reflected, scattered, or transmitted copy of the second ultrasonic signal; and
    (v) producing a first measurement signal based on the reflected, scattered, or transmitted copy of the first ultrasonic signal and a second measurement signal based on the reflected, scattered, or transmitted-copy of the second ultrasonic signal,
    and wherein (c) includes computing cross-correlation values for the first and second measurement signals with each of the templates and determining an estimated velocity of the fluid based on the cross-correlation values for the first and second measurement signals with each of the templates.

13. The method of claim 10 further comprising, before (b): generating the templates at a first sampling frequency; and sampling the templates at a second sampling frequency lower than the first sampling frequency.

14. The method of claim 10 further comprising, before (b): adding a first random waveform to the measurement signal; and adding a second random waveform to the templates.

15. The method of claim 10 wherein (b) comprises:
interpolating at least one of the measurement signal and the templates.

16. The method of claim 10 further comprising:
transmitting a representation of the estimated velocity or the measurement signal to a server.

17. A method of installing a fluid flow meter, the fluid flow meter comprising a sensor to detect an ultrasonic signal indicative of a velocity of a fluid flowing through a lumen and to provide a measurement signal indicative of the velocity based on the ultrasonic signal, a memory to store a plurality of templates, each template corresponding to a different possible velocity of the fluid compared to other templates and having a wave shape substantially matching a wave shape of the ultrasonic signal, wherein the templates are filtered to match a distortion associated with the ultrasonic signal caused by at least one of the lumen and the fluid, and a processor, communicatively coupled to the sensor and to the memory, to compute cross-correlation values for the measurement signal with each of the templates and to estimate the velocity based on the cross-correlation values, the method comprising:

securing the fluid flow meter to an exterior of a structure that defines the lumen.

18. The method of claim 17 further comprising:
setting the velocity to a known value;
generating an estimated velocity with the fluid flow meter; and
calibrating the fluid flow meter based on the known value and the estimated velocity.

19. The method of claim 18 further comprising:
generating an estimated diameter of the lumen based on the known value and the estimated velocity.

20. The method of claim 19 further comprising:
verifying the diameter of the lumen based on the estimated diameter and a description of the lumen or the structure.

* * * * *